US008837362B2

(12) United States Patent
Vartiainen et al.

(10) Patent No.: US 8,837,362 B2
(45) Date of Patent: Sep. 16, 2014

(54) METHOD AND APPARATUS FOR INTER-CELL INTERFERENCE COORDINATION PAGING OF A MOBILE TERMINAL IN AN IDLE STATE

(75) Inventors: Ville Vartiainen, Oulu (FI); Tero Henttonen, Espoo (FI); Samuli Turtinen, Ii (FI); Timo Koskela, Oulu (FI); Sami-Jukka Hakola, Kempele (FI)

(73) Assignee: Broadcom Corporation, Irvine, CA (US)

( * ) Notice: Subject to any disclaimer, the term of this patent is extended or adjusted under 35 U.S.C. 154(b) by 175 days.

(21) Appl. No.: 13/197,642

(22) Filed: Aug. 3, 2011

(65) Prior Publication Data

US 2013/0034051 A1 Feb. 7, 2013

(51) Int. Cl.

| H04W 4/00 | (2009.01) |
|---|---|
| H04W 24/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 68/00 | (2009.01) |
| H04W 84/04 | (2009.01) |

(52) U.S. Cl.
CPC .......... *H04W 68/005* (2013.01); *H04W 84/045* (2013.01)
USPC ........... 370/328; 370/228; 370/329; 370/330; 455/423

(58) Field of Classification Search
None
See application file for complete search history.

(56) References Cited

U.S. PATENT DOCUMENTS

| 2002/0086685 A1* | 7/2002 | Wallentin et al. | 455/458 |
|---|---|---|---|
| 2011/0310830 A1* | 12/2011 | Wu et al. | 370/329 |

FOREIGN PATENT DOCUMENTS

| WO | WO 2008/155739 A2 | 12/2008 |
|---|---|---|
| WO | WO 2009/148258 A2 | 12/2009 |
| WO | WO 2011/130447 A1 | 10/2011 |

OTHER PUBLICATIONS

Search Report for GB Application No. 1113382.4, dated Nov. 25, 2011.
R4-104648: Paging Channel Reliability Issues in Idle Mode and ABSF Patterns; XP050468647; Dec. 11, 2010; 3GPP TSG RAN WG4 Meeting #57 (Motorola).

(Continued)

*Primary Examiner* — Hassan Phillips
*Assistant Examiner* — Lonnie Sweet
(74) *Attorney, Agent, or Firm* — Stanton IP Law

(57) ABSTRACT

A method and apparatus are provided for reliably paging a mobile terminal in the idle mode, even in an instance in which the mobile terminal is subjected to interference from a CSG cell. In this regard, a method is provided that includes causing an indication of an inter-cell interference coordination (ICIC) paging period to be provided to the mobile terminal. The indication of the ICIC paging period includes an ICIC paging period $T_{ICIC}$ and a number $N_{ABS}$ of consecutive almost blank subframes (ABS) subframes in which a paging message is to be expected. The method also determines, for a respective ICIC paging period, the $N_{ABS}$ nearest ABS subframes of the CSG cell relative to a paging occasion (PO) subframe of the mobile terminal. A paging message is also provided to the mobile terminal in one of the $N_{ABS}$ nearest ABS subframes of the CSG cell.

24 Claims, 4 Drawing Sheets

(56) References Cited

OTHER PUBLICATIONS

R4-104150: eICIC Broadcast Channel Reliability; 3GPP TSG-RAN WG4 57; XP050468282; (QUALCOMM Incorporated) 2010.
International Search Report for Application No. PCT/IB2012/053924, dated Dec. 12, 2012.
Paging Channel Reliability Issue in Idle Mode and ABSF Patterns, *3GPP TSG-RAN WG4 Meeting #57*; R4-104648, Motorola (Nov. 2010) 5 pages.
Downlink Performance in the Presence of Interferences from ABSFs, *3GPP TSG-RAN WG4 Meeting #57*; R4-104647, Motorola (Nov. 2010) 8 pages.

* cited by examiner

METHOD AND APPARATUS FOR INTER-CELL INTERFERENCE COORDINATION PAGING OF A MOBILE TERMINAL IN AN IDLE STATE

TECHNOLOGICAL FIELD

Embodiments of the present invention relate generally to paging of a mobile terminal and, more particularly, to inter-cell interference coordination paging of a mobile terminal in an idle state.

BACKGROUND

In instances in which a mobile terminal is subject to interference, a macro cell may find it to be difficult to reliably page the mobile terminal, such as for cell selection or cell reselection purposes. For example, in instances in which the mobile terminal is not only within the coverage area of a macro cell, but is also within the coverage area of a closed subscriber group (CSG) cell, such as a femtocell, of which the mobile terminal is not a member, the CSG cell may create relatively strong interference for the mobile terminal, thereby leading to difficulties in the macro cell successfully paging the mobile terminal. These difficulties are particularly problematic in an instance in which the mobile terminal is in the idle mode. In this regard, interference from a CSG cell may make it difficult to reliably have a successful cell search with regard to the primary and secondary synchronization signals so as to permit a macro cell to initiate a cell selection or cell reselection process. Additionally, strong interference from a CSG cell may also reduce the reliability with which a mobile terminal may receive paging and system information blocks (SIBs) while located within the coverage area of a CSG cell.

Almost blank subframes (ABS) are subframes in which a cell deliberately does not transmit any data except for the critical control data, e.g. synchronization signals, paging or system information, and reference symbols. ABSs can be used to e.g. protect the mobile terminals close to the CSG cells. For example, by using ABS in a CSG cell and coordinating the timing of the ABS with the macro cell, the network is able to arrange occasions during which a mobile terminal is able to function despite being close to an interfering CSG cell For example, in order to reliably page a mobile terminal that is in the idle mode and that is otherwise subject to relatively strong interference from a CSG cell, the paging configuration of the network may be established such that the paging occasion (PO) of the macro cell aligns with the ABSs of the CSG cell. For example, the paging occasion in subframe 9 may be utilized by the macro cell in an instance in which subframe 9 is also the ABS of the CSG cell. In order to prevent interference between pages from the CSG cell and pages from the macro cell in subframe 9, a frame shift may be introduced between the CSG cell and the macro cell. However, this network configuration may make it challenging to attain the peak paging capacity, such as four subframes for a radio frame. For example, in an instance in which a frame shift of 10 milliseconds is introduced between the CSG cell and the macro cell, this network configuration may allow only one paging occasion every 20 milliseconds.

Another technique that has been proposed to remedy the adverse effects of interference from a CSG cell in regards to the paging of a mobile terminal in the idle mode is to provide for cross-subframe assignments in which a physical downlink control channel (PDCCH) resource on one subframe assigns a physical downlink shared channel (PDSCH) resource on another subframe. In accordance with this technique, a mobile terminal that is experiencing interference from a CSG cell may receive a PDCCH in a subframe that is an ABS subframe of the CSG cell. However, frequency domain multiplexing (FDM) coordination may be required to reduce the interference from the CSG cell to the resource blocks utilized by the macro cell for paging. Additionally, this approach may require changes to the radio access network so as to configure the cross-subframe related parameters and, in an instance in which the PDCCH reception occurs during a non-ABS subframe, to receive the PDCCH.

BRIEF SUMMARY

A method and apparatus are therefore provided in accordance with one embodiment for reliably paging a mobile terminal in the idle mode even in an instance in which the mobile terminal is subjected to interference from a CSG cell. As such, in an instance in which a mobile terminal is within the coverage area of a CSG cell, but the mobile terminal is not a member of the CSG, the mobile terminal of one example embodiment may reliably receive paging signals from a macro cell. The mobile terminal of one example embodiment advantageously need not have advance knowledge of the ABS patterns of the CSG cell and FDM coordination need not be specified for the paging operations.

In one embodiment, a method is provided that includes causing an indication of an inter-cell interference coordination (ICIC) paging period to be provided to a mobile terminal in an idle state. In this regard, causing the indication of the ICIC paging period to be provided includes providing an ICIC paging period $T_{ICIC}$ and a number $N_{ABS}$ of consecutive almost blank subframes (ABS) subframes in which a paging message is to be expected. The method of this embodiment also determines, with a processor, for a respective ICIC paging period, the $N_{ABS}$ nearest ABS subframes of a closed subscriber group (CSG) cell relative to a paging occasion (PO) subframe of the mobile terminal. Further, the method of this embodiment includes causing a paging message to be provided to the mobile terminal in one of the $N_{ABS}$ nearest ABS subframes of the CSG cell relative to the PO subframe of the mobile terminal.

In another embodiment, an apparatus is provided that includes at least one processor and at least one memory including computer program code with the at least one memory and the computer program code configured to, with the at least one processor, cause the apparatus at least to cause an indication of an inter-cell interference coordination (ICIC) paging period to be provided to a mobile terminal in an idle state. The indication of the ICIC paging period includes an ICIC paging period $T_{ICIC}$ and a number $N_{ABS}$ of consecutive almost blank subframes (ABS) subframes in which a paging message is to be expected. The at least one memory and the computer program code are also configured to, with the at least one processor, cause the apparatus to determine, for a respective ICIC paging period, the $N_{ABS}$ nearest ABS subframes of a closed subscriber group (CSG) cell relative to a paging occasion (PO) subframe of the mobile terminal. The at least one memory and the computer program code are further configured to, with the at least one processor, cause the apparatus to cause a paging message to be provided to the mobile terminal in one of the $N_{ABS}$ nearest ABS subframes of the CSG cell relative to the PO subframe of the mobile terminal.

In a further embodiment, a computer program product is provided that includes at least one non-transitory computer-readable storage medium having computer-readable program instructions stored therein with the computer-readable program instructions including program instructions configured to cause an indication of an inter-cell interference coordination (ICIC) paging period to be provided to a mobile terminal in an idle state. In this regard, the program instructions configured to cause the indication of the ICIC paging period to be provided include program instructions configured to provide an ICIC paging period $T_{ICIC}$ and a number $N_{ABS}$ of consecutive almost blank subframes (ABS) subframes in which a paging message is to be expected. The computer-readable program instructions of this embodiment also include program instructions configured to determine, for a respective ICIC paging period, the $N_{ABS}$ nearest ABS subframes of a closed subscriber group (CSG) cell relative to a paging occasion (PO) subframe of the mobile terminal. Further, the computer-readable program instructions of this embodiment include program instructions configured to cause a paging message to be provided to the mobile terminal in one of the $N_{ABS}$ nearest ABS subframes of the CSG cell relative to the PO subframe of the mobile terminal.

In yet another embodiment, an apparatus is provided that includes means for causing an indication of an inter-cell interference coordination (ICIC) paging period to be provided to a mobile terminal in an idle state. In this regard, the means for causing the indication of the ICIC paging period to be provided includes means for providing an ICIC paging period $T_{ICIC}$ and a number $N_{ABS}$ of consecutive almost blank subframes (ABS) subframes in which a paging message is to be expected. The apparatus of this embodiment also includes means for determining, for a respective ICIC paging period, the $N_{ABS}$ nearest ABS subframes of a closed subscriber group (CSG) cell relative to a paging occasion (PO) subframe of the mobile terminal. Further, the apparatus of this embodiment includes means for causing a paging message to be provided to the mobile terminal in one of the $N_{ABS}$ nearest ABS subframes of the CSG cell relative to the PO subframe of the mobile terminal.

In one embodiment, a method is provided that includes receiving an indication of an inter-cell interference coordination (ICIC) paging period to be provided while a mobile terminal is in an idle state. In this regard, receiving the indication of the ICIC paging period includes receiving an ICIC paging period $T_{ICIC}$ and a number $N_{ABS}$ of consecutive almost blank subframes (ABS) subframes in which a paging message is to be expected. The method of this embodiment also determines, with a processor, for a respective ICIC paging period, the $N_{ABS}$ nearest ABS subframes of a closed subscriber group (CSG) cell relative to a paging occasion (PO) subframe of the mobile terminal. Further, the method of this embodiment includes receiving a paging message in one of the $N_{ABS}$ nearest ABS subframes of the CSG cell relative to the PO subframe of the mobile terminal.

In another embodiment, an apparatus is provided that includes at least one processor and at least one memory including computer program code with the at least one memory and the computer program code configured to, with the at least one processor, cause the apparatus at least to receive an indication of an inter-cell interference coordination (ICIC) paging period while a mobile terminal is in an idle state. The indication of the ICIC paging period includes an ICIC paging period $T_{ICIC}$ and a number $N_{ABS}$ of consecutive almost blank subframes (ABS) subframes in which a paging message is to be expected. The at least one memory and the computer program code are also configured to, with the at least one processor, cause the apparatus to determine, for a respective ICIC paging period, the $N_{ABS}$ nearest ABS subframes of a closed subscriber group (CSG) cell relative to a paging occasion (PO) subframe of the mobile terminal. The at least one memory and the computer program code are further configured to, with the at least one processor, cause the apparatus to receive a paging message in one of the $N_{ABS}$ nearest ABS subframes of the CSG cell relative to the PO subframe of the mobile terminal.

In a further embodiment, a computer program product is provided that includes at least one non-transitory computer-readable storage medium having computer-readable program instructions stored therein with the computer-readable program instructions including program instructions configured to cause an indication of an inter-cell interference coordination (ICIC) paging period to be received with a mobile terminal in an idle state. In this regard, the program instructions configured to cause the indication of the ICIC paging period to be received include program instructions configured to receive an ICIC paging period $T_{ICIC}$ and a number $N_{ABS}$ of consecutive almost blank subframes (ABS) subframes in which a paging message is to be expected. The computer-readable program instructions of this embodiment also include program instructions configured to determine, for a respective ICIC paging period, the $N_{ABS}$ nearest ABS subframes of a closed subscriber group (CSG) cell relative to a paging occasion (PO) subframe of the mobile terminal. Further, the computer-readable program instructions of this embodiment include program instructions configured to receive a paging message in one of the $N_{ABS}$ nearest ABS subframes of the CSG cell relative to the PO subframe of the mobile terminal.

In yet another embodiment, an apparatus is provided that includes means for receiving an indication of an inter-cell interference coordination (ICIC) paging period while a mobile terminal is in an idle state. In this regard, the means for receiving the indication of the ICIC paging period includes means for receiving an ICIC paging period $T_{ICIC}$ and a number $N_{ABS}$ of consecutive almost blank subframes (ABS) subframes in which a paging message is to be expected. The apparatus of this embodiment also includes means for determining, for a respective ICIC paging period, the $N_{ABS}$ nearest ABS subframes of a closed subscriber group (CSG) cell relative to a paging occasion (PO) subframe of the mobile terminal. Further, the apparatus of this embodiment includes means for receiving a paging message in one of the $N_{ABS}$ nearest ABS subframes of the CSG cell relative to the PO subframe of the mobile terminal.

BRIEF DESCRIPTION OF THE DRAWINGS

Figure 1:
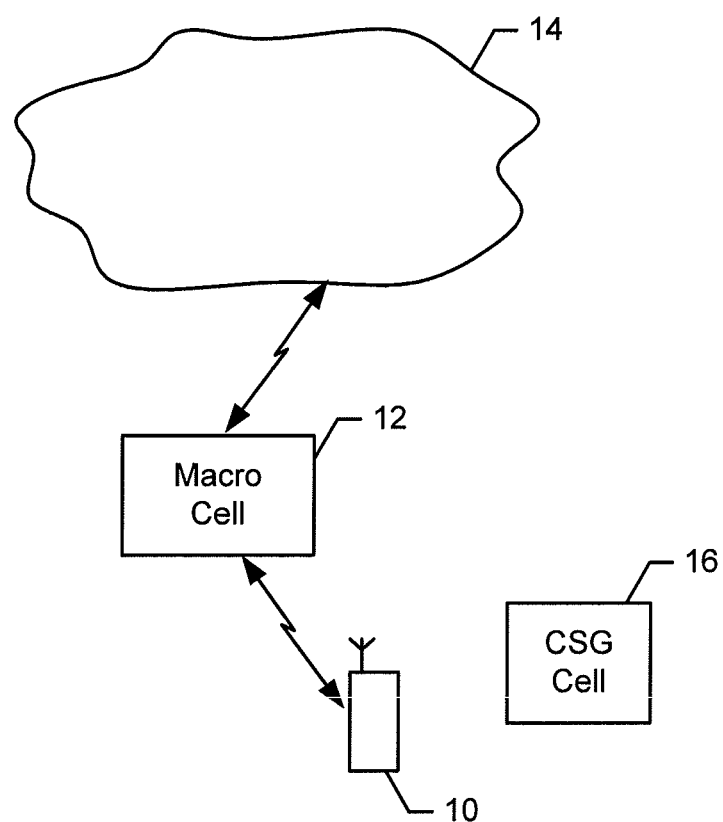
Figure 2:
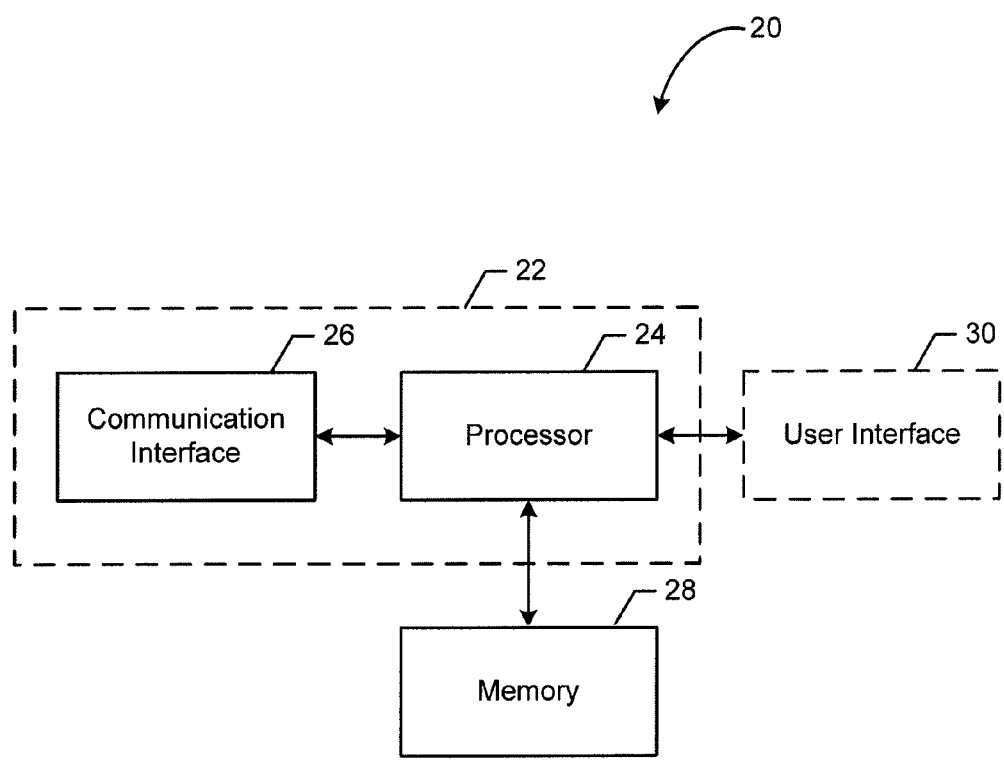
Figure 3:
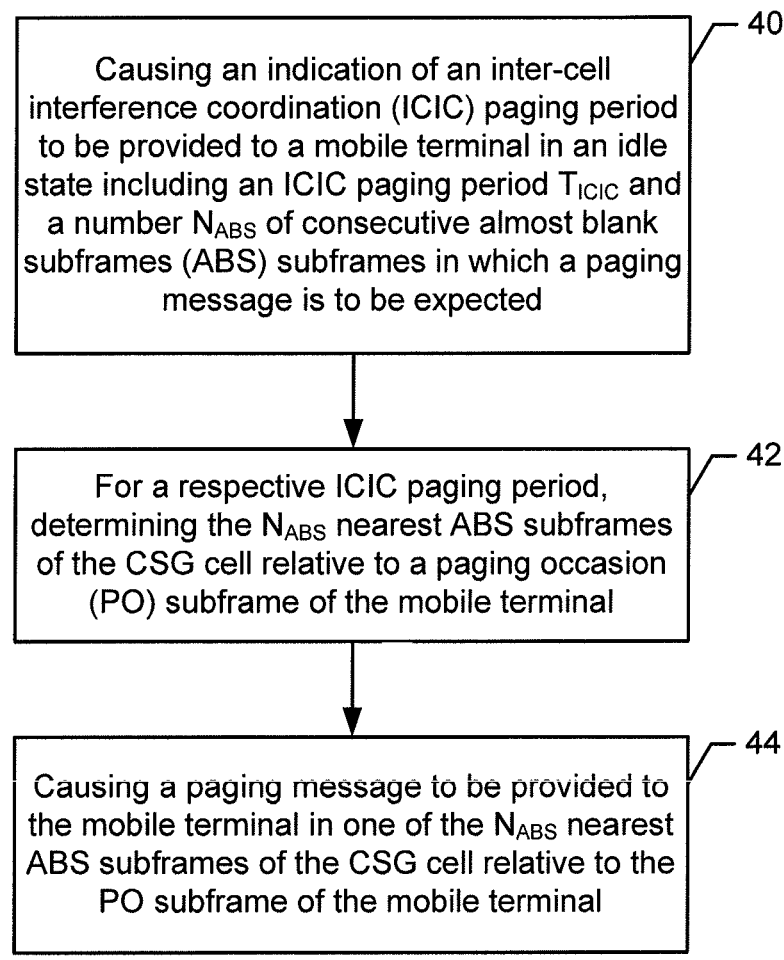
Figure 4:
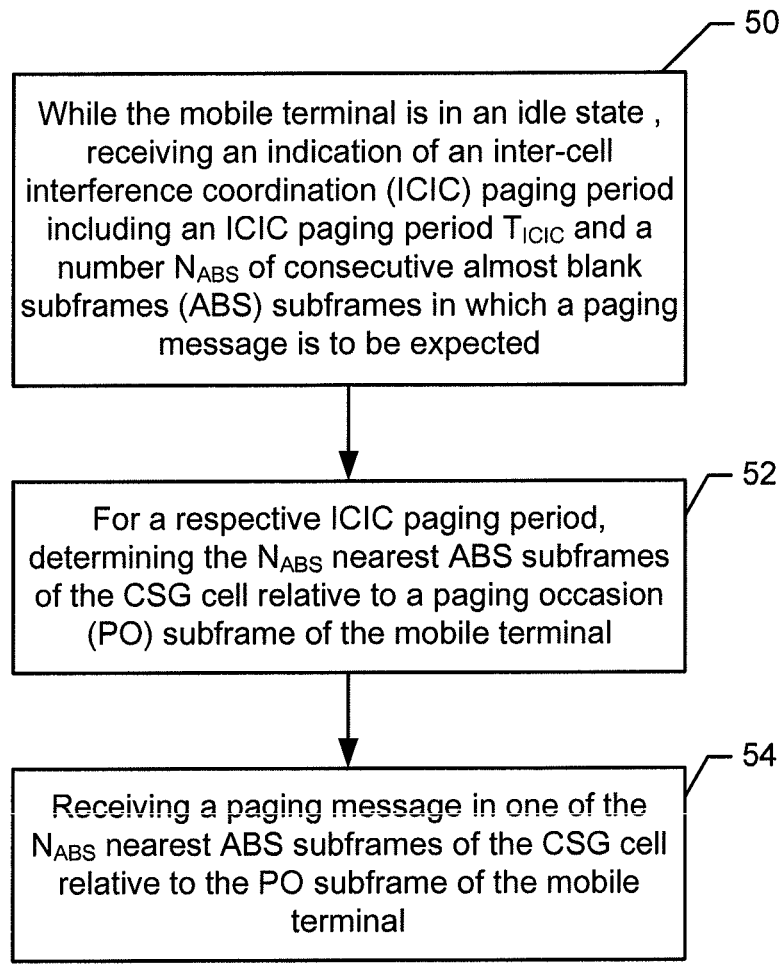

Having thus described the example embodiments of the invention in general terms, reference will now be made to the accompanying drawings, which are not necessarily drawn to scale, and wherein:

FIG. 1 is a schematic representation of a network in which example embodiments of the present invention may be implemented in order to reduce, if not eliminate, the deleterious effects of interference from a CSG cell upon paging of the mobile terminal by a macro cell;

FIG. 2 is a block diagram of an apparatus that may be embodied as a macro cell and/or a mobile terminal in accordance with embodiments of the present invention;

FIG. 3 is a flowchart illustrating operations performed from the perspective of a macro cell in accordance with one embodiment of the present invention; and FIG. 4 is a flowchart illustrating operations performed from the perspective of a mobile terminal in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are disclosed for providing for more reliable network paging of a mobile terminal in an idle mode, such as in an instance in which the mobile terminal is experiencing interference from a CSG cell of which the mobile terminal is not a member. The paging messages may be for various purposes including the establishment of a connection between the network, such as a macrocell, and the mobile terminal.

Although the method, apparatus and computer program product may be implemented in a variety of different systems, one example of such a system is shown in FIG. 1, which includes a first communication device (e.g., mobile terminal 10) that is capable of communication via a macro cell 12, such as a base station, a Node B, an evolved Node B (eNB) or other access point, with a network 14 (e.g., a core network). While the network may be configured in accordance with Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more macro cells 12, each of which may serve a coverage area divided into one or more cells. The macro cell could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the macro cell 12 and, in turn, the network 14. In some cases, the communication device may include an antenna for transmitting signals to and for receiving signals from a macro cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, the mobile terminal 10 and/or the macro cell 12 may be embodied as or otherwise include an apparatus 20 as generically represented by the block diagram of FIG. 2. While the apparatus 20 may be employed, for example, by a mobile terminal 10 or a macro cell 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as a macro cell 12, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the macro cell 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIGS. 3 and 4, flowcharts illustrating the operations performed by a method, apparatus and computer program product, such as apparatus 20 of FIG. 2, from the perspective of a macro cell 12 and a mobile terminal 10 in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 4, when executed, convert a computer or processing circuitry into a particular machine configured to perform an example embodiment of the present invention. Accordingly, the operations of each of FIGS. 3 and 4 define an algorithm for configuring a computer or processing circuitry 22, e.g., processor, to perform an example embodiment. In some cases, a general purpose computer may be provided with an instance of the processor which performs the algorithm of a respective one of FIGS. 3 and 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

With reference to the system of FIG. 1, the macro cell 12 may be configured to page the mobile terminal 10, such as by issuing paging messages, while the mobile terminal is in the idle state, such as the RRC_IDLE state in an LTE system. The macro cell 12 may issue the paging messages for various purposes including for establishing a connection with the mobile terminal 10. In some instances such as shown in FIG. 1, the mobile terminal 10 may be within the coverage area of not only the macro cell 12, but also the coverage area of a CSG cell 16, such as a femtocell, picocell, microcell or the like. A CSG cell 16 maintains a listing of the mobile terminals that are authorized to access or otherwise utilize the CSG cell. In example embodiments of the present invention, however, the mobile terminal 10 may not be approved or allowed to utilize the CSG cell 16 even though the mobile terminal is within the coverage area of the CSG cell. Nonetheless, as a result of being within the coverage area of the CSG cell 16, the mobile terminal 10 may experience interference from the CSG cell even though the mobile terminal is not a member of the CSG with the interference from the CSG cell potentially preventing or hindering the reliable receipt of the paging messages from the macro cell 12 in the absence of embodiments of the present invention.

In accordance with embodiments of the present invention and as shown in operation 40 of FIG. 3, the apparatus 20 embodied by the macro cell 12 may include means, such as the processing circuitry 22, processor 24, communication interface 26 or the like, for causing an indication of an inter-cell interference coordination (ICIC) paging period to be provided to the mobile terminal 10 while the mobile terminal is in an idle state. While the apparatus 20 embodied by the macro cell 12 may be configured such that all paging messages provide an indication of the ICIC paging period, the apparatus of one embodiment may initially issue a paging message in a conventional manner (since the macro cell generally does not know if the mobile terminal is experiencing interference from a CSG cell) and, in an instance in which the conventional paging message is not received and acted upon, may follow up by causing an indication of the ICIC paging period to be provided in accordance with embodiments of the present invention. The indication of the ICIC paging period may be provided in various manners, such as via radio resource control (RRC) signaling, e.g. an RRCConnection-Release message, between the macro cell 12 and the mobile terminal 10 or via a broadcast message, such as within a system information block SIB2, e.g., within the radioResourceConfigCommon information element (IE), or another system information block (SIB), from the macro cell that is received by the mobile terminal, as well as potentially other terminals.

As also shown in operation 40 of FIG. 3, the indication of the ICIC paging period may include an ICIC paging period $T_{ICIC}$. The ICIC paging period $T_{ICIC}$ may be a multiple of the paging period T of the mobile terminal 10. In the regard, the ICIC paging period $T_{ICIC}$ may be less than, equal to or greater than the paging period T of the mobile terminal 10. In one embodiment, for example, the ICIC paging period $T_{ICIC}$ may be provided directly to the mobile terminal 10 by providing the value of the ICIC paging period $T_{ICIC}$. However, the ICIC paging period $T_{ICIC}$ may be provided indirectly with the apparatus 20 embodied by the macro cell 12 of one embodiment providing a multiplier $nB_{ICIC}$ with the product of the multiplier $nB_{ICIC}$ and the paging period T of the mobile terminal 10 defining the ICIC paging period. The multiplier $nB_{ICIC}$ may be less than, equal to or greater than one such that the ICIC paging period $T_{ICIC}$ may, in turn, also be less than, equal to or greater than the paging period T of the mobile terminal 10.

The indication of the ICIC paging period may also include the number $N_{ABS}$ of consecutive subframes of the CSG cell that have relatively low interference. For example, these subframes could be almost blank subframes (ABS) or other low interference subframes. As such, ABS subframes shall be used herein to refer not only to ABS subframes as defined by the LTE specification, but also other subframes that are configured to create low interference for the mobile terminal 10, such as less interference for the mobile terminal than is created by other subframes. See operation 40 of FIG. 3. As explained hereinafter, the paging message provided by the macro cell 12 will be expected by the mobile terminal 10 within the ABS subframes.

As shown in operation 42 in FIG. 3, the apparatus 20 once embodied by the macro cell 12 may also include means, such as the processing circuitry 22, the processor 24 or the like, for determining, for a respective ICIC paging period, the $N_{ABS}$ nearest ABS subframes of the CSG cell 16 relative to a paging occasion (PO) subframe of the mobile terminal 10. In this regard, the mobile terminal 10 may have an PO subframe within the macro cell 12 which is derived from the macro cell specific paging parameters and an identifier, such as the international mobile subscriber identity (IMSI), of the mobile terminal. As such, the apparatus 20 embodied by the macro cell 12, such as the processing circuitry 22, the processor 24 or the like, may determine the $N_{ABS}$ subframes of the CSG cell 16 that are nearest to the PO subframe of the mobile terminal 10. The $N_{ABS}$ nearest ABS subframes of the CSG cell 16 may be either prior to the PO subframe of the mobile terminal 10 or subsequent to the PO subframe of the mobile terminal. As described below, the $N_{ABS}$ nearest ABS subframes of the CSG cell 16 may sometimes, but not always, overlap the PO subframe of the mobile terminal 10.

The apparatus 20 embodied by the macro cell 12 may also include means, such as the processing circuitry 22, the processor 24, the communication interface 26 or the like, for causing a paging message to be provided to the mobile terminal 10 in one of the $N_{ABS}$ nearest ABS subframes of the CSG cell 16 relative to the PO subframe of the mobile terminal. See operation 44 of FIG. 3. By providing the paging message from the macro cell 12 within the ABS subframes of the CSG cell 16, the interference that the paging message from the macro cell will experience may be reduced or eliminated, thereby increasing the reliability with which the mobile terminal 10 may receive the paging message and respond appropriately thereto.

In an instance in which one of the $N_{ABS}$ nearest ABS subframes of the CSG cell 16 overlaps with the PO subframe of mobile terminal 10, the apparatus 20 embodied by the macro cell 12 may include means, such as the processing circuitry 22, the processor 24 or the like, for mapping the paging message including, for example, an identifier, such as a temporary mobile subscriber identity (TMSI), radio network temporary identifier (RNTI) or the like, of the mobile terminal to the PO subframe that overlaps with an ABS subframe of the CSG cell. Alternatively, in an instance in which the $N_{ABS}$ nearest ABS subframes of the CSG cell 16 do not overlap with the PO subframe of the mobile terminal 10, the apparatus 20 embodied by the macro cell 12 may include means, such as the processing circuitry 22, the processor 24 or the like, for mapping the paging message including, for example, the TMSI or RNTI of the mobile terminal 10 to the ABS subframe of the CSG cell that is nearest to the PO subframe. In this embodiment, the ABS subframe of the CSG cell 16 that is nearest to the PO subframe into which the paging message including, for example, the TMSI or RNTI of the mobile terminal 10 is mapped may either prior to or subsequent to the PO subframe.

In addition to causing a paging message to be provided to the mobile terminal 10 in one of the $N_{ABS}$ nearest ABS subframes of the CSG cell 16 relative to the PO subframe of the mobile terminal, the apparatus 20 embodied by the macro cell 12 of one embodiment may include means, such as the processing circuitry 22, the processor 24, the communication interface 26 or the like, for causing a paging message to also be provided in the PO subframe of the mobile terminal in an instance in which the $N_{ABS}$ nearest ABS subframes of the CSG cell do not overlap with the PO subframe of the mobile terminal. By providing paging messages in both the PO subframe of the mobile terminal 10 and the nearest ABS subframe of the CSG cell 16 to the PO subframe in accordance with this embodiment, the reliability with which the mobile terminal receives the paging message from the macro cell 12 is increased.

In one embodiment in which the mobile terminal 10 is within the coverage areas of a plurality of CSG cells 16 that have differently configured ABS patterns, the apparatus 20 embodied by the macro cell 12 may include means, such as the processing circuitry 22, the processor 24 or the like, for forming a CSG cell group including the plurality of CSG cells. In this embodiment, the apparatus 20 embodied by the macro cell 12 may include means, such as the processing circuitry 22, the processor 24 or the like, for determining which CSG cells of the CSG cell group have $N_{ABS}$ nearest ABS subframes that overlap with the PO subframe of the mobile terminal 10. For the CSG cells 16 of the CSG cell group having $N_{ABS}$ nearest ABS subframes that overlap with the PO subframe of the mobile terminal 10, the apparatus 20 of the macro cell 12 may include means, such as the processing circuitry 22, the processor 24 or the like, for mapping the paging message to the PO subframe of the mobile terminal.

Additionally or alternatively, for the CSG cells 16 that do not include $N_{ABS}$ nearest ABS subframes that overlap with the PO subframe of the mobile terminal 10, the apparatus 20 embodied by the macro cell 12 may include means, such as the processing circuitry 22, the processor 24 or the like, for determining the nearest ABS subframe of each respective CSG cell to the PO subframe of the mobile terminal. In this instance, the apparatus 20 embodied by the macro cell 12 may include means, such as the processing circuitry 22, the processor 24 or the like, for mapping the paging message to the ABS subframe of each respective CSG cell that is nearest to the PO subframe of the mobile terminal 10. In an instance in which the $N_{ABS}$ nearest ABS subframes of two or more CSG cells 16 of the CSG cell group do not overlap with the PO subframe of the mobile terminal 10, but overlap with one another, the apparatus 20 embodied by the macro cell 12 may include means, such as the processing circuitry 22, the processor 24 or the like, for mapping the paging message including, for example, the TMSI or RNTI of the mobile terminal to the ABS subframe selected from among the ABS subframes that overlap between the plurality of CSG cells that is nearest to the PO subframe of the mobile terminal. Thus, the method and apparatus 20 of this embodiment may increase the likelihood that the mobile terminal 10 will receive the paging messages by causing the paging messages to be transmitted in an appropriate ABS subframe of each CSG cell 16 within the CSG cell group.

From the perspective of the mobile terminal 10 as shown in operation 50 of FIG. 4, an apparatus 20 embodied by the mobile terminal may be provided that includes means, such as the processing circuitry 22, the processor 24, the communication interface 26 or the like, for receiving an indication of the ICIC paging period while the mobile terminal is in the idle state. The indication of the ICIC paging period may be provided in various manners, such as via RRC signaling, e.g. an RRCConnectionRelease message, between the macro cell 12 and the mobile terminal 10 or via a broadcast message, such as within SIB2, e.g., within the radioResourceConfigCommon IE, or another SIB, from the macro cell that is received by the mobile terminal, as well as potentially other terminals.

The indication of the ICIC paging period may include an ICIC paging period $T_{ICIC}$ and a number $N_{ABS}$ of consecutive ABS subframes in which a paging message is to be expected. As described above, the apparatus 20 embodied by the mobile terminal 10, such as the processing circuitry 22, the processor 24, the communication interface 26 or the like, may receive the ICIC paging period $T_{ICIC}$ directly in the form of the value of the ICIC paging period or indirectly by receiving a multiplier $nB_{ICIC}$ of the paging period T of the mobile terminal. In this embodiment, the ICIC paging period $T_{ICIC}$ may be determined by the apparatus 20, such as by the processing circuitry 22, the processor 24 or the like, as the product of the multiplier in the paging period T of the mobile terminal 10. As noted above, the ICIC paging period $T_{ICIC}$ may be smaller than, equal to or greater than the paging period T of the mobile terminal 10. In the embodiment in which a multiplier $nB_{ICIC}$ is provided, the multiplier may therefore be less than, equal to or greater than one.

At least in an instance in which the mobile terminal 10 is within the coverage area of a CSG cell 16 of which the mobile terminal is not a member, the apparatus 20 embodied by the mobile terminal 10 may include means, such as the processing circuitry 22, the processor 24 or the like, for determining, for a respective ICIC paging period, the $N_{ABS}$ nearest ABS subframes of the CSG cell 16 relative to the PO subframe of the mobile terminal. See operation 52 in FIG. 4. The apparatus 20 embodied by the mobile terminal 10 may also include means, such as the processing circuitry 22, the processor 24, the communication interface 26 or the like, for receiving a paging message from the macro cell 12 in one of the $N_{ABS}$ nearest ABS subframes of the CSG cell 16 relative to the PO subframe of the mobile terminal. For example, the paging message may include the TMSI or RNTI of the mobile terminal 10. See operation 54 of FIG. 4.

In an embodiment in which the $N_{ABS}$ nearest ABS subframes of the CSG cell 16 overlap with the PO subframe of the mobile terminal 10, the apparatus 20 embodied by the mobile terminal may include means, such as processing circuitry 22, the processor 24, the communication interface 26 or the like, for receiving a paging message including, for example, the TMSI or RNTI of the mobile terminal in the PO subframe that overlaps with the ABS subframe of the CSG cell. Alternatively, in an instance in which the $N_{ABS}$ nearest ABS subframes of the CSG cell 16 do not overlap with PO subframe of the mobile terminal 10, the apparatus 20 embodied by the mobile terminal may include means, such as the processing circuitry 22, the processor 24, the communication interface 26 or the like, for receiving the paging message including, for example, the TMSI or RNTI of a mobile terminal in the ABS subframe of the CSG cell that is nearest to the PO subframe. By receiving the paging message within the ABS subframe of the CSG cell 16, the reliability with which the mobile terminal 10 receives the paging message may be increased even in an instance in which the mobile terminal suffers interference from the CSG cell. In order to further increase the reliability with which the mobile terminal 10 receives the paging message in an instance in which the nearest ABS subframes of the CSG cell 16 do not overlap with the PO subframe of the mobile terminal, the apparatus 20 embodied by the mobile terminal of one embodiment may include means, such as the processing circuitry 22, the processor 24, the communication interface 26 or the like, for also receiving the paging message in the PO subframe such that the mobile terminal of this embodiment receives the paging message in both the PO subframe and in the ABS subframe of the CSG cell that is nearest to the PO subframe.

In one embodiment, the mobile terminal 10 is within the coverage area of a plurality of CSG cells 16 having different ABS patterns. In this embodiment, a CSG cell group may be defined to include the plurality of CSG cells 16 with different ABS patterns. For the CSG cells 16 of the CSG cell group having $N_{ABS}$ nearest ABS subframes that overlap with the PO subframe of the mobile terminal 10, the apparatus 20 of the mobile terminal may include means, such as the processing circuitry 22, the processor 24, the communication interface 26 or the like, for receiving the paging message in the PO subframe of the mobile terminal.

Additionally or alternatively, for the CSG cells 16 that do not include $N_{ABS}$ nearest ABS subframes that overlap with the PO subframe of the mobile terminal 10, the apparatus 20 embodied by the mobile terminal may include means, such as the processing circuitry 22, the processor 24, the communication interface 26 or the like, for receiving the paging message in the ABS subframe of each respective CSG cell that is nearest to the PO subframe of the mobile terminal. In an instance in which the $N_{ABS}$ nearest ABS subframes of two or more CSG cells 16 of the CSG cell group do not overlap with the PO subframe of the mobile terminal 10, but overlap with one another, the apparatus 20 embodied by the mobile terminal may include means, such as the processing circuitry 22, the processor 24, the communication interface 26 or the like, for receiving the paging message including, for example, the TMSI or RNTI of the mobile terminal in the ABS subframe selected from among the ABS subframes that overlap between the plurality of CSG cells that is nearest to the PO subframe of the mobile terminal.

According to embodiments of the present invention, a mobile terminal 10 in the idle mode may more reliably receive paging messages even while experiencing interference from one or more CSG cells 16, such as when the mobile terminal is within the coverage area of one or more CSG cells of which the mobile terminal is not a member. Additionally, the method and apparatus 20 of embodiments of the present invention permit the mobile terminal 10 to more reliably receive paging messages without requiring feedback from the mobile terminal and without requiring configuration rules for when the mobile terminal applies ICIC. Further, the mobile terminal 10 advantageously need not know the ABS pattern(s) of the CSG cell(s) 16 and there need not be FDM coordination for paging.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while principally described herein in conjunction with LTE, the method and apparatus of example embodiments may be employed in conjunction with other types of systems. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  causing an indication of an inter-cell interference coordination (ICIC) paging period to be provided to a mobile terminal in an idle state, wherein causing the indication of the ICIC paging period to be provided comprises providing an ICIC paging period $T_{ICIC}$ and a number $N_{ABS}$ of consecutive almost blank subframes (ABS) subframes in which a paging message is to be expected;
  for a respective ICIC paging period, determining by a macro cell the $N_{ABS}$ nearest ABS subframes of a closed subscriber (CSG) cell relative to a paging occasion (PO) subframe of the mobile terminal; and
  causing the paging message to be provided to the mobile terminal in one of the $N_{ABS}$ nearest ABS subframes of the CSG cell relative to the PO subframe of the mobile terminal; wherein
  for the case of the PO subframe overlaps with one of the ABS subframes mapping the paging message to the PO subframe; and
  for the case of the PO subframe does not overlap with any of the ABS subframes mapping the paging message to one of the $N_{ABS}$ subframes which is not also the PO subframe.

2. A method according to claim 1 wherein providing the ICIC paging period $T_{ICIC}$ comprises providing a multiplier $nB_{ICIC}$ of a paging period T of the mobile terminal, and wherein the ICIC paging period $T_{ICIC}$ is a product of the multiplier $nB_{ICIC}$ and the paging period T.

3. A method according to claim 1 wherein causing the paging message to be provided to the mobile terminal comprises mapping the paging message including a temporary mobile subscriber identity (TMSI) of the mobile terminal to the PO subframe, for the case the PO subframe overlaps with one of the ABS subframes of the CSG cell.

4. A method according to claim 3 further comprising forming a CSG cell group comprising a plurality of CSG cells with different ABS patterns, wherein mapping the paging message comprises mapping the paging message to the PO subframe, for the case the PO subframe overlaps with one of the ABS subframes of a respective CSG cell of the CSG cell group.

5. A method according to claim 1 wherein causing the paging message to be provided to the mobile terminal comprises mapping the paging message including a temporary mobile subscriber identity (TMSI) of the mobile terminal to one of the ABS subframes of the CSG cell that is nearest to the PO subframe, for the case the PO subframe does not overlap with any of the ABS subframes.

6. A method according to claim 5 further comprising forming a CSG cell group comprising a plurality of CSG cells with different ABS patterns, wherein mapping the paging message comprises mapping the paging message to one of the ABS subframes of each CSG cell of the CSG cell group that is nearest to the PO subframe, for the case the PO subframe does not overlap with any of the ABS subframes.

7. An apparatus comprising:
  at least one processor; and
  at least one memory including computer program code,
  the at least one memory and the computer program code configured to, with the at least one processor, cause the apparatus at least to:
  cause an indication of an inter-cell interference coordination (ICIC) paging period to be provided to a mobile terminal in an idle state, wherein causing the indication of the ICIC paging period to be provided comprises providing an ICIC paging period $T_{ICIC}$ and a number $N_{ABS}$ of consecutive almost blank subframes (ABS) subframes in which a paging message is to be expected;
  for a respective ICIC paging period, determine by a macro cell comprising the appartus the $N_{ABS}$ nearest ABS subframes of a closed subscriber (CSG) cell relative to a paging occasion (PO) subframe of the mobile terminal; and cause the paging message to be provided to the mobile terminal in one of the $N_{ABS}$ nearest ABS subframes of the CSG cell relative to the PO subframe of the mobile terminal; wherein:

for the case the PO subframe overlaps with one of the ABS subframes mapping the paging message to the PO subframe; and for the case the PO subframe does not overlap with any of the ABS subframes mapping the paging message to one of the $N_{ABS}$ subframes which is not also the PO subframe.

8. An apparatus according to claim 7 wherein the at least one memory and the computer program code are configured to, with the at least one processor, cause the apparatus to provide the ICIC paging period $T_{ICIC}$ by providing a multiplier $nB_{ICIC}$ of a paging period T of the mobile terminal, and wherein the ICIC paging period $T_{ICIC}$ is a product of the multiplier $nB_{ICIC}$ and the paging period T.

9. An apparatus according to claim 7 wherein the at least one memory and the computer program code are configured to, with the at least one processor, cause the apparatus to cause the paging message to be provided to the mobile terminal by mapping the paging message including a temporary mobile subscriber identity (TMSI) of the mobile terminal to the PO subframe, for the case the PO subframe overlaps with one of the ABS subframes of the CSG cell.

10. An apparatus according to claim 9 wherein the at least one memory and the computer program code are further configured to, with the at least one processor, cause the apparatus to form a CSG cell group comprising a plurality of CSG cells with different ABS patterns, wherein the at least one memory and the computer program code are configured to, with the at least one processor, cause the apparatus to map the paging message by mapping the paging message to the PO subframe, for the case the PO subframe overlaps with one of the ABS subframes of the CSG cell.

11. An apparatus according to claim 7 wherein the at least one memory and the computer program code are configured to, with the at least one processor, cause the apparatus to cause the paging message to be provided to the mobile terminal by mapping the paging message including a temporary mobile subscriber identity (TMSI) of the mobile terminal to one of the ABS subframes of the CSG cell that is nearest to the PO subframe, for the case the subframe does not overlap with any of the ABS subframes.

12. An apparatus according to claim 11 wherein the at least one memory and the computer program code are further configured to, with the at least one processor, cause the apparatus to form a CSG cell group comprising a plurality of CSG cells with different ABS patterns, wherein the at least one memory and the computer program code are configured to, with the at least one processor, cause the apparatus to map the paging message by mapping the paging message to one of the ABS subframes of each CSG cell of the CSG cell group that is nearest to the PO subframe, for the case the PO subframe does not overlap with any of the ABS subframes.

13. A method comprising:
receiving an indication of an inter-cell interference coordination (ICIC) paging period while a mobile terminal is in an idle state, wherein receiving the indication of the ICIC paging period comprises receiving an ICIC paging period $T_{ICIC}$ and a number $N_{ABS}$ of consecutive almost blank subframes (ABS) subframes in which a paging message is to be expected;

for a respective ICIC paging period, determing the $N_{ABS}$ nearest ABS subframes of a closed subscriber (CSG) cell relative to a paging occasion (PO) subframe of the mobile terminal; and receiving the paging message in one of the $N_{ABS}$ nearest ABS subframes of the CSG cell relative to the PO subframe of the mobile terminal; wherein for the case the PO subframe overlaps with one of the ABS subframes receiving the paging message in the PO subframe; and for the case the PO subframe does not overlap with any of the ABS subframes mapping the paging message to one of the $N_{ABS}$ subframes which is not also the PO subframe.

14. A method according to claim 13 wherein receiving the ICIC paging period $T_{ICIC}$ comprises receiving a multiplier $B_{ICIC}$ of a paging period T of the mobile terminal, and wherein the ICIC paging period $T_{ICIC}$ is a product of the multiplier $nB_{ICIC}$ and the paging period T.

15. A method according to claim 13 wherein receiving the paging message comprises receiving the paging message including a temporary mobile subscriber identity (TMSI) of the mobile terminal in the PO subframe, for the case the PO subframe overlaps with one of the ABS subframes of the CSG cell.

16. A method according to claim 15 wherein a CSG cell group includes a plurality of CSG cells with different ABS patterns, and wherein receiving the paging message comprises receiving the paging message in each PO subframe, for the case the PO subframe overlaps with one of the ABS subframes of a respective CSG cell of the CSG cell group.

17. A method according to claim 13 wherein receiving the paging message comprises receiving the paging message including a temporary mobile subscriber identity (TMSI) of the mobile terminal in one of the ABS, subframes of the CSG cell that is nearest to the PO subframe, for the case the PO subframe does not overlap with any of the ABS subframes.

18. A method according to claim 17 wherein a CSG cell group includes a plurality of CSG cells with different ABS patterns, and wherein receiving the paging message comprises receiving the paging message in one of the ABS subframes of each CSG cell of the CSG cell group that is nearest to the PO subframe, for the case the PO subframe does not overlap with any of the ABS subframes.

19. An apparatus comprising:
at least one processor; and
at least one memory including computer program code,
the at least one memory and the computer program code configured to, with the at least one processor, cause the apparatus at least to:
receive an indication of an inter-cell interference coordination (ICIC) paging period while a mobile terminal is in an idle state, wherein receiving the indication of the ICIC paging period comprises receiving an ICIC paging period $T_{ICIC}$ and a number $N_{ABS}$ of consecutive almost blank subframes (ABS) subframes in which a paging message is to be expected;

for a respective ICIC paging period, determine the $N_{ABS}$ nearest ABS subframes of a closed subscriber (CSG) cell relative to a paging occasion (PO) subframe of the mobile terminal; and receive the paging message in one of the $N_{ABS}$ nearest ABS subframes of the CSG cell relative to the PO subframe of the mobile terminal; wherein for the case the PO subframe overlaps with one of the ABS subframes receiving the paging message in the PO subframe; and for the case the PO subframe does not overlap with any of the ABS subframes mapping the paging message to one of the $N_{ABS}$ subframes which is not also the PO subframe.

20. An apparatus according to claim 19 wherein the at least one memory and the computer program code are configured to, with the at least one processor, cause the apparatus to receive the ICIC paging period $T_{ICIC}$ by receiving a multiplier $nB_{ICIC}$ of a paging period T of the mobile terminal, and wherein the ICIC paging period $T_{ICIC}$ is a product of the multiplier $nB_{ICIC}$ and the paging period T.

21. An apparatus according to claim 20 wherein the at least one memory and the computer program code are configured to, with the at least one processor, cause the apparatus to receive the paging message by receiving the paging message including a temporary mobile subscriber identity (TMSI) of the mobile terminal in the PO subframe, for the case the PO subframe overlaps with one of the ABS subframes of the CSG cell.

22. An apparatus according to claim 21 wherein a CSG cell group includes a plurality of CSG cells with different ABS patterns, and wherein the at least one memory and the computer program code are configured to, with the at least one processor, cause the apparatus to receive the paging message by receiving the paging message in each PO subframe, for the case the PO subframe overlaps with one of the ABS subframes of a respective CSG cell of the CSG cell group.

23. An apparatus according to claim 20 wherein the at least one memory and the computer program code are configured to, with the at least one processor, cause the apparatus to receive the paging message by receiving the paging message including a temporary mobile subscriber identity (TMSI) of the mobile terminal in one of the ABS subframes of the CSG cell that is nearest to the PO subframe, for the case the PO subframe does not overlap with any of the ABS subframes.

24. An apparatus according to claim 23 wherein a CSG cell group includes a plurality of CSG cells with different ABS patterns, and wherein the at least one memory and the computer program code are configured to, with the at least one processor, cause the apparatus to receive the paging message comprises receiving the paging message in one of the ABS subframes of each CSG cell of the CSG cell group that is nearest to the PO subframe, for the case the PO subframe does not overlap with any of the ABS subframes.

* * * * *

UNITED STATES PATENT AND TRADEMARK OFFICE
CERTIFICATE OF CORRECTION

| | | |
|---|---|---|
| PATENT NO. | : 8,837,362 B2 | Page 1 of 1 |
| APPLICATION NO. | : 13/197642 | |
| DATED | : September 16, 2014 | |
| INVENTOR(S) | : Ville Vartiainen et al. | |

It is certified that error appears in the above-identified patent and that said Letters Patent is hereby corrected as shown below:

In the Claims,

Claim 1 at column 14, line 8, replace "subscriber (CSG) cell relative to" with --subscriber group (CSG) cell relative to--.

Claim 1 at column 14, line 14, replace "for the case of the PO subframe overlaps" with --for the case the PO subframe overlaps--.

Claim 1 at column 14, line 17, replace "for the case of the PO subframe does not overlap" with --for the case the PO subframe does not overlap--.

Claim 7 at column 15, line 1, replace "frames of a closed subscriber (CSG) cell relative" with --frames of a closed subscriber group (CSG) cell relative--.

Claim 13 at column 16, line 1, replace "ICIC paging period, determing the" with --ICIC paging period, determining the--.

Claim 19 at column 16, line 59, replace "subframes of a closed subscriber (CSG)" with --subframes of a closed subscriber group (CSG)--.

Signed and Sealed this
Nineteenth Day of May, 2015

Michelle K. Lee
*Director of the United States Patent and Trademark Office*